(12) United States Patent
Zhang et al.

(10) Patent No.: US 7,962,480 B1
(45) Date of Patent: Jun. 14, 2011

(54) USING A WEIGHTED TREE TO DETERMINE DOCUMENT RELEVANCE

(75) Inventors: Li Zhang, Sunnyvale, CA (US); Yuhong Xiong, Mountain View, CA (US); Shicong Feng, Beijing (CN); Yong Zhao, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 700 days.

(21) Appl. No.: 11/831,841

(22) Filed: Jul. 31, 2007

(51) Int. Cl.
*G06F 7/04* (2006.01)
*G06F 17/21* (2006.01)

(52) U.S. Cl. ........ 707/729; 707/730; 707/750; 707/803; 707/804

(58) Field of Classification Search .............. 707/7, 100, 707/102, 104.1, 999.007, 999.1, 999.102, 707/999.104, 803, 804, 729, 730, 750
See application file for complete search history.

(56) References Cited

U.S. PATENT DOCUMENTS

| | | | | |
|---|---|---|---|---|
| 5,873,081 A | * | 2/1999 | Harel | 707/3 |
| 7,596,581 B2 | * | 9/2009 | Frank et al. | 1/1 |
| 2009/0319565 A1 | * | 12/2009 | Greenwald et al. | 707/103 Y |

* cited by examiner

*Primary Examiner* — James Trujillo
*Assistant Examiner* — Bruce M Moser (57) ABSTRACT

The relevance of documents is automatically determined based upon a weighted tree. Terms considered to be relevant are assigned to the leaf nodes of a tree data structure. A location can also be specified in a leaf node, indicating where in a document the term must appear to be considered relevant. Internal nodes of the tree are assigned operators (e.g., add, maximum or minimum). The connections between nodes are assigned weights. A relevance value for a given document is calculated as a function of occurrence in the document of terms assigned to leaves, operators assigned to internal nodes, and weights assigned to the associated node connections. Weighted trees can be used to process search queries. Documents with high relevance scores calculated against the tree can be returned to a user as the results to a query.

18 Claims, 4 Drawing Sheets

USING A WEIGHTED TREE TO DETERMINE DOCUMENT RELEVANCE

TECHNICAL FIELD

This invention pertains generally to automatically determining document relevance, and more specifically to using a weighted tree to make such determinations.

BACKGROUND ART

Classification of documents is a classical topic in Statistics and Computer. Science, for which numerous methods exist. These methods range from the simple, such as the use of Boolean formulas to the more sophisticated, such as k-nearest neighbor, support vector machine and neural network. It is often desirable to classify documents in an environment in which the crucial features form a small number of clusters, and the accuracy is inherently limited due to the data noise. Under such circumstances, the existing classification methods require complicated modeling and learning phases. What is needed are more intuitive, flexible, and efficient methods, computer readable media and computer systems for performing such document classification tasks.

Another scenario in which document classification can be of great use is searching for relevant documents. Boolean queries are commonly used by various search engines to obtain search results. Despite its great success, the expressive power of Boolean queries are limited in that the user can only specify keywords for which to search. Thus, an important limitation of Boolean querying is it does not allow the user to specify a preference and/or context of the keywords in the search query. Therefore, the search results are not prioritized in any way mapped to the importance of the various keywords. It would be further desirable to have methods, computer readable media and computer systems for performing document relevance classification in the context of searching, such that the preference and/or context of the keywords could be taken into account.

SUMMARY

The relevance of documents is automatically determined based upon a weighted tree. Terms considered to be relevant are assigned to the leaf nodes of a tree data structure. A location can also be specified in a leaf node, indicating where in a document the term must appear to be considered relevant. Each internal node of the tree (including the root) is assigned an operator such as add, maximum or minimum. The connections between nodes are assigned weights.

A relevance value for a given document is calculated as a function of occurrence in the document of terms assigned to leaf nodes of the tree, the operators assigned to internal nodes of the tree data structure, and the weights assigned to the associated node connections.

Weighted trees can be used to process search queries, in which priority of and relationships between multiple terms are defined by a weighted tree. A set of documents with high relevance scores calculated against the tree can be returned to a user as the results to a query.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
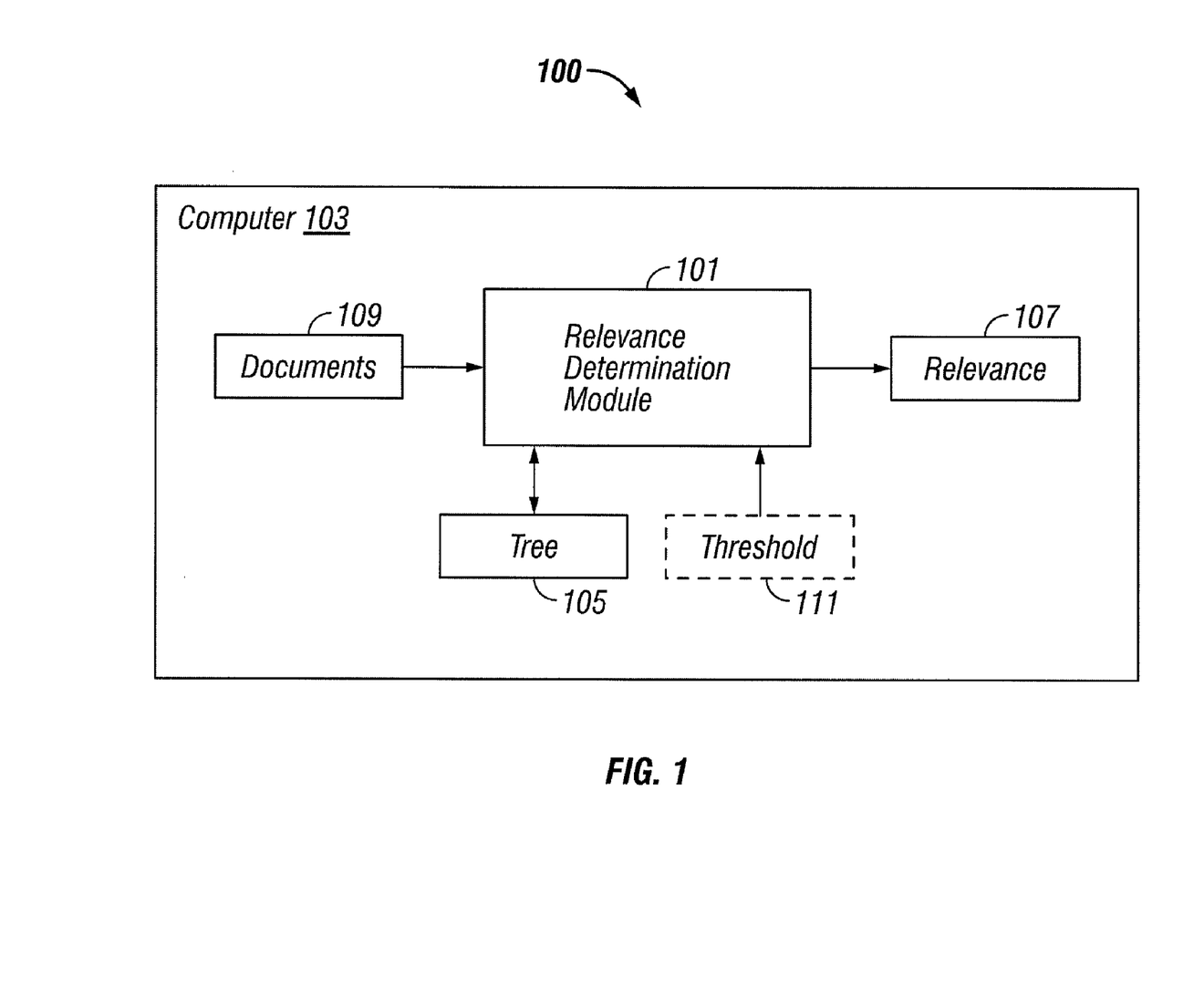
FIG. 1 is a block diagram illustrating a system for automatically determining document relevance, according to some embodiments of the present invention.

FIG. 1 illustrates a system 100 for automatically determining document relevance 107, according to some embodiments of the present invention. As illustrated, a relevance determination module 101 runs on a computer 103. It is to be understood that although the relevance determination module 101 is illustrated in FIG. 1 as a separate entity, as used herein the term "relevance determination module" 101 refers to a collection of functionalities which can be implemented as software, hardware, firmware or any combination of these. Where a relevance determination module 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the relevance determination module 101 utilizes a weighted tree 105 to calculate the relevance 107 of each of a plurality of documents 109. The weighted tree 105 (described in detail below) specifies terms of interest and associated weights, and is used to determine relevance values 107 for documents 109 based upon whether the terms appear in the documents 109.

Figure 2:
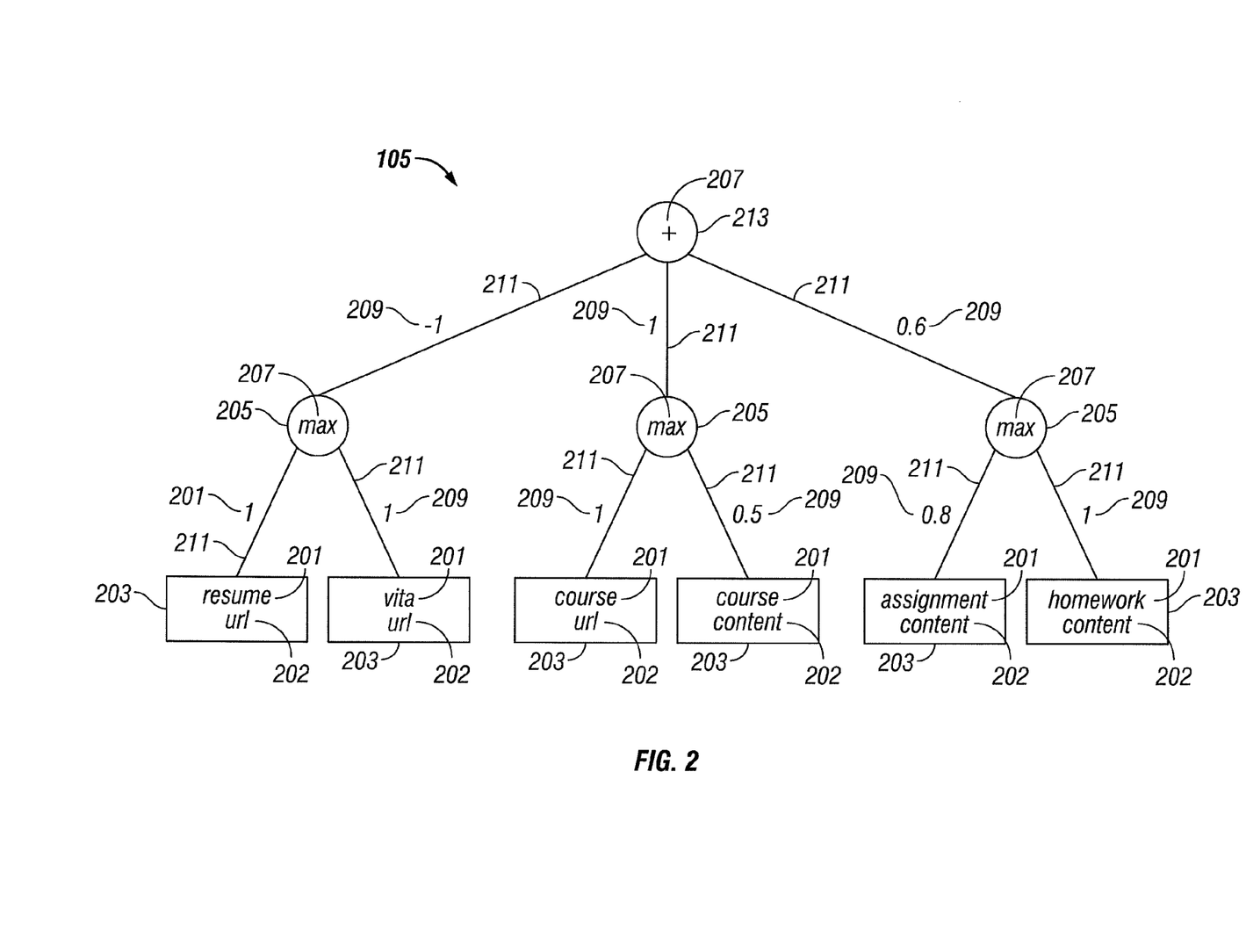
FIG. 2 is a graph illustrating an example of a weighted tree for automatically determining document relevance, according to some embodiments of the present invention.

An example weighted tree 105 is illustrated in FIG. 2. Describing weighted trees 105 generally, a term 201 of interest is assigned to each leaf node 203 of the tree 105. In some but not all embodiments of the present invention, a location 202 is also assigned to each leaf node 203 (as illustrated in FIG. 2), or to some but not all leaf nodes 203 (not illustrated). Each internal node 205 (i.e., all nodes other than the leaves 203) are assigned an operator 207, the use of which is described below. A root node 213 is herein considered to be a specific type of internal node 205. A weight 209 is assigned to each node connection 211 (i.e., the connections 211 between nodes).

The terms 201 of the leaf nodes 203 represent words (or other content such as phrases) the presence of which in a document 109 indicates whether that document 109 is or is not relevant, based on the criteria of the particular tree 105. The location 202, where present in a leaf node 203, modifies the term 201 of a given leaf node 203 by specifying where in the document 109 it must appear (e.g., in the content, the title, the uniform resource locator (URL), the address, the header, the metadata, etc.) to be considered relevant. Note that the same term 201 can be represented by multiple leaf nodes 203, each with a separate location 202 indicating that the presence of the same term 201 in different locations 202 of a document 109 has different relevance values 107. For example, in FIG. 2 the term "course" appears in two separate leaf nodes 203, once with location URL and once with the location content.

The weights 209 indicate levels of importance assigned to various terms 201. For example, positive numbers can indicate the level of relevance 107 signified by the presence of the term 201 (e.g., 10 is more relevant than 3). Negative numbers can indicate that a specific term 201 signifies that a document 109 is less relevant (e.g., −3 is less relevant than −1).

The operators 207 indicate an operation to use in order to calculate a relevance factor 107 based on the child nodes 203, 205. For example, if a node 205, 213 is assigned the addition operator 207, the value of that node 205, 213 is calculated by adding the values of all of its immediate child nodes 203, 205, adjusted according to the weight 209 of the connectors 211. Other possible operators 207 are the maximum operator 207 and the minimum operator 207. When a node 205, 213 is assigned the maximum operator 207, that indicates that the value of that node 205, 213 is to be calculated by determining which of its child nodes 203, 205 has the highest value, and assigning that value to the node 205, 213 with the maximum operator 207, adjusted according to the weight 209 of the connector. The minimum operator 207 works the same way, except that the value of the child node 203, 205 with the lowest value is assigned (adjusted according to connector weight 209). Of course, other operators 207 can be utilized as desired, for example, to combine values according to other mathematical operations or formulas.

Figure 3:
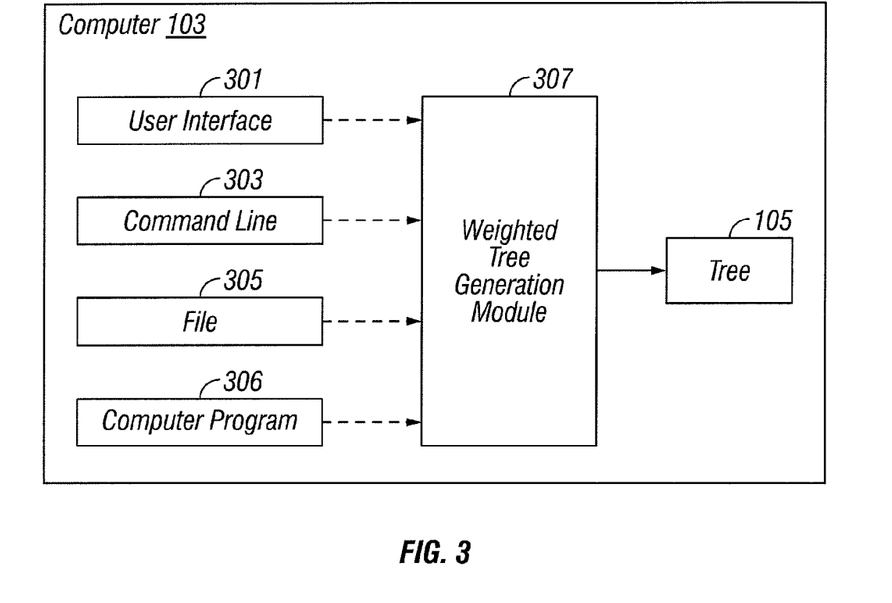
FIG. 3 is a block diagram illustrating a system for building weighted trees, according to some embodiments of the present invention.

It is to understood that it is the content and arrangement of the tree 105 itself (i.e., the terms 201, locations 202, operators 207 and weights 209) that determines what is considered relevant. A user can construct a tree 105 based upon what he considers to be relevant. As illustrated in FIG. 3, the terms 201, locations 202, operators 207 and weights 209 for the tree 105 can be input by a user operating an interface 301 or a command line 303, read from a file 305 or received from a running computer program 306. This data is then processed by a weighted tree generation module 307 into a tree 105 data structure. The relevance determination module 101 can then analyze one or more documents 109 for relevance against the tree 105. Like the relevance determination module 101, the weighted tree generation module 307 comprises a plurality of functionalities, and can be implemented as one or more software, hardware and/or firmware components as desired.

Turning to the specific example tree 105 illustrated in FIG. 2, suppose a user wants to determine the relevance 107 of each of a plurality of documents 109 believed to concern academic courses, according to a specific set of criteria. The three level tree 105 illustrated in FIG. 2 could be used for this purpose, wherein the tree 105 represents the criteria by which to determine the relevance 107 of the documents 109. In this example, the root node 213 is assigned the addition operator 207 (+), and the second level of the tree 105 consists of nodes 205 which are each assigned the maximum operator 207 (max). Each of the nodes 205 assigned the maximum operator 207 can be thought as a clustering node 205 for similar keywords, represented by the leaf nodes 203 below. The leaf nodes 203 contain terms 201 of interest and associated locations 202.

Classification of a document 109 according to the tree 105 is performed from the bottom of the tree 105 up to the root node 213. For example, suppose the plurality of documents 109 in question are web pages, and the user is interested in finding web pages that describe academic classes at universities. Starting at the bottom left of FIG. 2, the first and second leaf nodes 203 contain the terms "resume" and "vita" (roughly equivalent terms 201) with a specified location 202 of URL. As the relevance determination module 101 processes a web page, it looks for these terms 201 in the URL, and if either or both is found, a corresponding score (e.g., 1) is assigned to the appropriate leaf node 203. For a term 201 not found at the specified location 202, a score of (e.g., 0) is assigned to the corresponding leaf node 203, indicating that the term 201 is not present in the document 109 at the specified location 202.

The values of the leaf nodes 203 are then processed according to their parent operator 207 (in this case the max operator 207). The execution of the max operator 207 in the parent node 205 assigns the value of the leaf node 203 with the highest value to the parent node 205, multiplied (or alternatively otherwise adjusted according to) the weight 209 of the connector. In this case, if either (or both) of these terms 201 appear in the URL, one (or both) of these leaf nodes 203 will evaluate to the value of 1. On the other hand, if neither of these terms 201 appear in the URL of the page, both nodes will evaluate to 0. Thus, the two possible values for each node are 1 and 0. If either or both nodes evaluate to 1, the max node 205 will be assigned the value 1 (the value of the leaf node 203 with the highest value, adjusted by the value of the connector, both of which are 1). On the other hand, if neither term 201 appears, the max node 205 will be assigned the value of 0.

As the connector 211 between this max node 205 and the + node 213 at the root of the tree 105 is −1, it will be understood that the user who defined the tree 105 believes that the appearance of either of these terms 201 in the URL indicates that the page is less likely to comprise a class page, whereas the absence of the terms 201 does not affect the likelihood one way or the other. In other words, the definition of the tree 105 assumes that the presence of these terms 201 in the URL indicates that the page is in fact a resume and not a class page. The tree 105 is further defined based on the notion that both resumes and class pages can contain similar terms 201 in the content itself, but class pages are not likely to have the terms "resume" or "vita" in their URLs.

The next set of leaf nodes 203 corresponds to the term "course" in both the URL and the content. As is expressed by the weights 209 assigned to the connectors 211 between these leaf nodes 203 and their parent max operator 207, the term "course" is assigned twice the weight 209 when it appears in the URL than in the content (1 versus 0.5). The weight of 1 assigned to the connector 211 between this parent max node 205 and the root+node 213 shows that the presence of the term "course" in either the URL or the content is an indication that the page is a class page.

The terms "homework" and "assignment" (represented by the leaf nodes 203 at the far right of the tree 105) are substitutable, but homework has a slightly higher correlation to a class page (represented by the respective weights of 1 and 0.8). The weight of 0.6 assigned to the connector 211 between the corresponding max node 205 and the root node 213 indicates that the presence of either of these terms 201 in the content is indicative of the page being a class page, but less so than the term "course."

Thus, relevance 107 of a document 109 containing the terms 201 represented by the leaf nodes 203 can be determined by first clustering the terms 201 with a common parent node 205, and then applying a linear classifier. This is particularly suitable to applications in which the user has a fairly good idea of the relevant keywords and their relation.

To consider a few example documents 109 in the context of FIG. 2, assume two documents 109 are analyzed against that tree 105. One of the documents 109 is a course page and the other one is a resume. If the URL of the course page is "www.caltech.edu/physics/course/qed" and the content contains both the words "homework" and "assignment" (but none of the other terms 201 in the leaves 203 of the tree 105), then the document 109 receives a score of 1.6. On the other hand, if the URL of the resume is "www.caltech.edu/~feynman/resume.html" and the content again contains the both the terms "homework" and "assignment" (but not any of the other terms 201), then that document 109 receives a score of −0.4.

It is to be understood that an actual tree 105 used to classify the relevance 107 of documents 109 within the context of academic class pages would likely be much more detailed (e.g., contain many more terms 201 connected with complex relationships) than the example tree 105 of FIG. 2. The number of terms 201 and the relationship complexity in FIG. 2 is kept smaller than a real word instantiation for purposes of ease of understanding and illustration.

For additional clarity, document relevance 107 determination using a weighted tree 105 according to one embodiment of the present invention is now described mathematically. It is to be understood that what follows is a mathematical description of the material described above in non-mathematical language.

In a tree T, each internal node u is assigned an operator $OP_u$ that belongs to the set {max, min, +} (the set can contain other elements in other embodiments), each edge e is assigned a real weight $W_e$, and each leaf node v is assigned a pair of ($keyword_v$, $place_v$) (in other embodiments some or all of the leaf nodes 203 are assigned only $keyword_v$). The score of a document d at a node u is denoted by s(d, u). The score can be evaluated from the bottom of T up as follows. At a leaf node v, the score s(d, v)=1 if $keyword_v$ appears in d at $place_v$ (which for example can be "URL", "content", etc); and 0 otherwise. In a more sophisticated variation, the leaf score can also be weighted according to the keyword's appearance frequency in a document 109. For each internal node u, suppose that the children of u are and the corresponding edge weights are then the score at node u is recursively defined as:

$$s(d,u)=OP_u(w_1 \cdot s(d,v_1), \ldots, w_n \cdot s(d,v_n))$$

where $OP_u$ belongs to the set {max, min, +}, each an n-ary operator 207, that computes, respectively, the maximum, minimum, and sum of the operands. The value of a document d is defined as s(d,r) where r is the root of the tree T.

One area in which determination of document relevance 107 is important is searching for documents 109 based on a query. Weighted trees 105 are particularly useful in this context. By using a weighted tree 105 in a searching context, a user can specify relative values of different keywords and relationships between them. In other words, by defining a specific weighted tree 105 rather than a simple Boolean search query, the user can specify the nature of relevant documents 109 with much greater particularity. To use the tree 105 as a query, the relevance determination module 101 can determine the relevance 107 of a set of documents 109 according to the tree 105, and present a most relevant subset thereof as the results to the query. The set of documents 109 can comprise anything from all the data on the Internet, to the contents of one or more specific databases or computer readable mediums, to a closed set of documents 109 such as the documents 109 returned in response to a search based on one or more Boolean queries. A specified threshold 111 (as illustrated in FIG. 1) can be used to determine the members of the subset to present to the user as the results to the weighted tree 105 based query. The threshold 111 can comprise, for example, a number of most relevant documents 109 to present to the user or a minimum document relevance value 107 for a document 109 to be included. According to one embodiment of the present invention, document d is held to satisfy a query Q=(T,t) if s(d,r)≧t, where T=the tree, t=the threshold, s=the score and r=the root of the tree.

Figure 4:
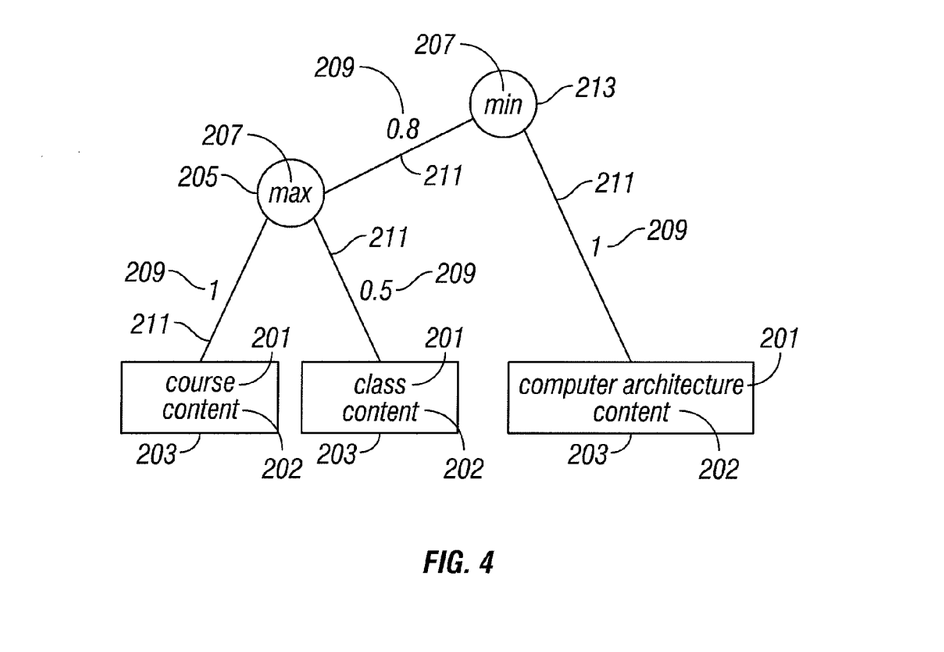
FIG. 4 is a graph illustrating another example of a weighted tree for automatically determining document relevance, according to some embodiments of the present invention.

As can be seen, weighted tree 105 based searching can provide a flexible and powerful alternative or extension to Boolean queries. For example, when a user searches for pages about, e.g., computer architecture courses, he may form a Boolean query such as ("course" or "class") and "computer architecture" but he will have no control on how each keyword is emphasized in the search; it is entirely up to the search engine to make the decision. In a weighted tree 105 based search, on the other hand, the user may assign higher scores to certain keywords. For example, as illustrated in the example weighted tree 105 of FIG. 4, if the user believes that the keyword "course" is more relevant to the query than the keyword "class," he can assign it a higher weight 209 (1 as opposed to 0.5)

Figure 5:
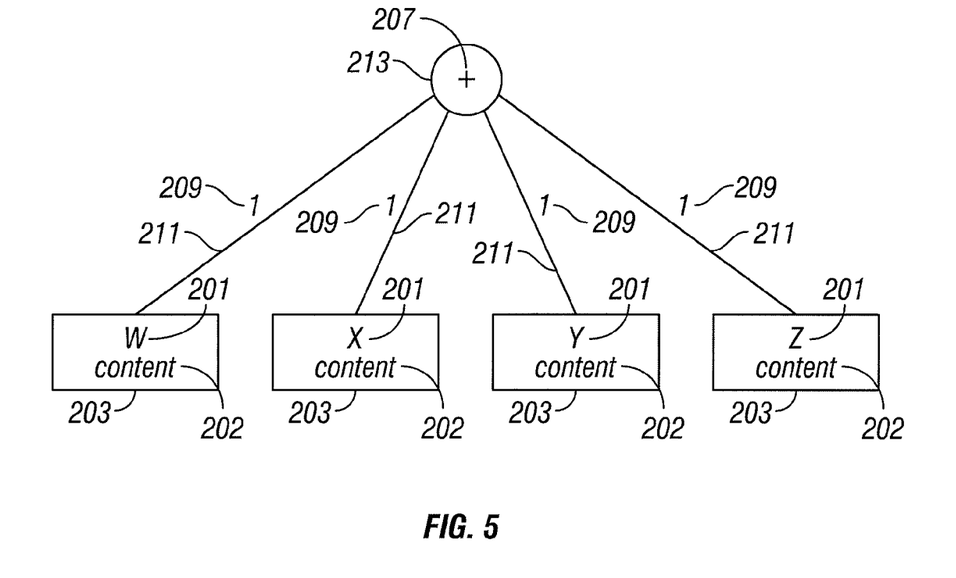
FIG. 5 is a graph illustrating yet another example of a weighted tree for automatically determining document relevance, according to some embodiments of the present invention.

FIG. 5 illustrates another example. If a user wants to search for a document 109 which contains at least two keywords among four keywords W, X, Y, and Z, he would have to form a fairly long Boolean query. On the other hand, by using the weighted tree 105 illustrated in FIG. 5 with a threshold 111 of 2, the user can express the query as a simple linear threshold 111.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for automatically determining document relevance, the method comprising:
   representing a plurality of terms as a tree data structure comprising internal nodes and leaf nodes interconnected by respective node connections;
   assigning to each of the leaf nodes of the tree data structure a respective one of the terms;
   assigning to at least one of the leaf nodes a respective location specifying a designated location for the term assigned to the leaf node to appear within a document;
   assigning a respective operator to each of the internal nodes of the tree data structure;
   assigning a respective weight to each of the node connections in the tree data structure; and
   calculating a respective relevance value for at least one document as a function of occurrence in the at least one document of the terms respectively assigned to the leaf nodes of the tree data structure, the operators assigned to internal nodes of the tree data structure, and the weights assigned to the associated node connections and, for each of the leaf nodes assigned a respective location, occurrence of the term assigned to the leaf node at the location in the at least one document specified by the respective location assigned to the leaf node.

2. The method of claim 1 wherein:
   each assigned location is one from a group consisting of: uniform resource locator, address, content, header and metadata.

3. The method of claim 1 wherein:
   each assigned operator is one from a group consisting of: maximum, minimum and add.

4. The method of claim 1 further comprising:
   calculating a relevance value for at least one document for the terms assigned to leaf nodes of the tree structure; and
   presenting to a user as results of a search query at least one document resulting from the search query meeting a given relevance threshold value.

5. The method of claim 4 wherein the given relevance threshold value comprises at least one of:
   a minimum document relevance value; and
   a specified number of documents having highest respective relevance values to present to the user as the results of the search query.

6. The method of claim 1 further comprising receiving terms, operators and weights of the tree data structure from at least one source from a group of sources consisting of:
   a user interface;
   at least one file;
   a command line; and
   a computer program.

7. At least one computer readable medium containing a computer program product for automatically determining document relevance, the computer program product comprising program code that, when executed by a computer, causes the computer to perform operations comprising:
   representing a plurality of terms as a tree data structure comprising internal nodes and leaf nodes interconnected by respective node connections;
   assigning to each of the leaf nodes of the tree data structure a respective one of the terms;
   assigning to at least one of the leaf nodes a respective location specifying a designated location for the term assigned to the leaf node to appear within a document;
   assigning a respective operator to each of the internal nodes of the tree data structure;
   assigning a respective weight to each node connections in the tree data structure; and
   calculating a respective relevance value for at least one document as a function of occurrence in the at least one document of the terms respectively assigned to the leaf nodes of the tree data structure, the operators assigned to parent internal nodes of the corresponding leaf nodes, and the weights assigned to the associated node connections and, for each of the leaf nodes assigned a respective location, occurrence of the term assigned to the leaf node at the location in the at least one document specified by the respective location assigned to the leaf node.

8. The computer program product of claim 7 wherein:
   each assigned location is one from a group consisting of: uniform resource locator, address, content, header and metadata.

9. The computer program product of claim 7 wherein:
   each assigned operator is one from a group consisting of: maximum, minimum and add.

10. The computer program product of claim 7 further comprising:
   program code for calculating a relevance value for at least one document for the terms assigned to leaf nodes of the tree structure; and
   program code for presenting to a user as results of a search query at least one document resulting from the search query meeting a given relevance threshold value.

11. The computer program product of claim 10 wherein the given relevance threshold value comprises at least one of:
   a minimum document relevance value; and
   a specified number of documents having highest respective relevance values to present to the user as the results of the search query.

12. The computer program product of claim 7 further comprising program code for receiving terms, operators and weights of the tree data structure from at least one source from a group of sources consisting of:
   a user interface;
   at least one file;
   a command line; and
   a computer program.

13. A computer system for automatically determining document relevance, the computer system comprising computer hardware configured to perform operations comprising:
   representing a plurality of terms as a tree data structure comprising internal nodes and leaf nodes interconnected by respective node connections;
   assigning to each of the leaf nodes of the tree data structure a respective one of the terms;
   assigning to at least one of the leaf nodes a respective location specifying a designated location for the term assigned to the leaf node to appear within a document;
   assigning a respective operator to each of the internal nodes of the tree data structure;
   assigning a respective operator to each of the node connections in the tree data structure; and
   calculating a respective relevance value for at least one document as a function of occurrence in the at least one document of the terms respectively assigned to the leaf nodes of the tree data structure, the operators assigned to parent internal nodes of the corresponding leaf nodes, and the weights assigned to the associated node connections and, for each of the leaf nodes assigned a respective location, occurrence of the term assigned to the leaf node at the location in the at least one document specified by the respective location assigned to the leaf node.

14. The computer system of claim 13 wherein:
each assigned location is one from a group consisting of: uniform resource locator, address, content, header and metadata.

15. The computer system of claim 13 wherein:
each assigned operator is one from a group consisting of: maximum, minimum and add.

16. The computer system of claim 13 wherein the computer hardware is to perform operations comprising:
calculating a relevance value for at least one document for the terms assigned to leaf nodes of the tree structure; and
presenting to a user as results of a search query at least one document resulting from the search query meeting a given relevance threshold value.

17. The computer system of claim 16 wherein the given relevance threshold value comprises at least one of:
a minimum document relevance value; and
a specified number of documents having highest respective relevance values to present to the user as the results of the search query.

18. A computer implemented method for automatically determining document relevance, the method comprising:

accessing a tree structure representing a plurality of terms, the tree data structure comprising internal nodes and leaf nodes interconnected by respective node connections, each of the leaf nodes of the tree data structure being assigned to a respective one of the terms, at least one of the leaf nodes being assigned to a respective location specifying a designated location for the term assigned to the leaf node to appear within a document, a respective operator being assigned to each of the internal nodes of the tree data structure, and a respective weight being assigned to each of the node connections in the tree data structure; and calculating a respective relevance value for at least one document as a function of occurrence in the at least one document of the terms respectively assigned to the leaf nodes of the tree data structure, the operators assigned to internal nodes of the tree data structure, and the weights assigned to the associated node connections and, for each of the leaf nodes assigned a respective location, occurrence of the term assigned to the leaf node at the location in the at least one document specified by the respective location assigned to the leaf node.

\* \* \* \* \*

UNITED STATES PATENT AND TRADEMARK OFFICE
CERTIFICATE OF CORRECTION

| | | |
|---|---|---|
| PATENT NO. | : 7,962,480 B1 | Page 1 of 1 |
| APPLICATION NO. | : 11/831841 | |
| DATED | : June 14, 2011 | |
| INVENTOR(S) | : Li Zhang et al. | |

It is certified that error appears in the above-identified patent and that said Letters Patent is hereby corrected as shown below:

IN THE SPECIFICATIONS:

In column 5, line 46, delete "are and" and insert -- are $v_1, \ldots, v_n$ and --, therefor.

In column 5, line 46, delete "are then" and insert -- are $w_1, \ldots, w_n$ then --, therefor.

IN THE CLAIMS:

In column 9, line 12, in Claim 16, delete "is to" and insert -- is configured to --, therefor.

Signed and Sealed this
Twenty-ninth Day of November, 2011

David J. Kappos
*Director of the United States Patent and Trademark Office*